United States Patent [19]
Ishida et al.

[11] Patent Number: 5,185,394
[45] Date of Patent: * Feb. 9, 1993

[54] RUBBER-MODIFIED STYRENE TYPE RESIN COMPOSITION EXCELLENT IN SLIDING PROPERTIES

[75] Inventors: Yuzuru Ishida; Masahiro Mitsuboshi; Haruo Inoue, all of Kanagawa; Ichiro Otsuka, Tokyo; Keiji Iio, Kanagawa, all of Japan

[73] Assignee: Mitsui Toatsu Chemicals, Inc., Tokyo, Japan

[ * ] Notice: The portion of the term of this patent subsequent to Jan. 22, 2008 has been disclaimed.

[21] Appl. No.: 584,603

[22] Filed: Sep. 19, 1990

Related U.S. Application Data

[63] Continuation of Ser. No. 352,942, May 17, 1989, abandoned.

Foreign Application Priority Data

May 23, 1988 [JP] Japan .................... 63-123897

[51] Int. Cl.$^5$ ............................... C08K 5/54
[52] U.S. Cl. ........................................ 524/269
[58] Field of Search ............................. 524/269

[56] References Cited

U.S. PATENT DOCUMENTS 4,987,170  1/1991  Ishida et al. ................... 524/267

FOREIGN PATENT DOCUMENTS 0230760  8/1987  European Pat. Off. .
57-172948  10/1982  Japan .
60-217254A  10/1985  Japan .

OTHER PUBLICATIONS

WPIL, File Supplier, accession No. 82-03150J [48], Derwent Publications Ltd., London, GB; & JP-A-57 170 950 (Mitsui Toatsu Chem.) Oct. 21, 1982, Abstract.
WPIL, File Supplier, accession No. 85-313237 [50], Derwent Publications Ltd., London, GB; & JP-A-60 217 254 (Dainippon Ink Chem.) Oct. 3, 1985, Abstract.
Patent Abstracts of Japan, vol. 13, No. 100, Jan. 18, 1986; & JP-A-60 166 338 (Asahi Kasei Kogyo) Aug. 29, 1985, Abstract.

Primary Examiner—Paul R. Michl
Assistant Examiner—John J. Guarriello
Attorney, Agent, or Firm—Burns, Doane, Swecker & Mathis

[57] ABSTRACT

A rubber-modified styrene type resin composition excellent in sliding properties which comprises 100 parts by weight of a rubber-modified styrene type resin and 2.2 to 3.2 parts by weight of dimethyl silicone oil having a viscosity ranging from 5,000 to 15,000 centistokes at 25° C., the styrene type resin comprising 3 to 8% by weight of a rubber-like polymer which is present in the form of microgels having an average particle size ranging from 0.6 to 1.2 micron, and having an intrinsic viscosity of 0.53 to 0.65 and the content of methanol-soluble matter in the range of from 0.5 to 1.5% by weight, is herein disclosed. The rubber-modified styrene type resin composition is excellent in its sliding properties and thus does not provide a molded product having poor appearance during molding. The rubber-modified styrene type resin composition is used to form mechanical parts in the fields of household appliances and OA apparatuses.

6 Claims, No Drawings

RUBBER-MODIFIED STYRENE TYPE RESIN COMPOSITION EXCELLENT IN SLIDING PROPERTIES

This application is a continuation of application Ser. No. 352,942, filed May 17, 1989 now abandoned.

BACKGROUND OF THE INVENTION

The present invention relates to a rubber-modified styrene resin composition which is excellent in sliding properties and which does not provide molded products having poor appearance during molding.

Considerable progress has recently been made in the technical developments in the fields of household appliances and office automation (OA) apparatuses and these apparatuses have been made more and more lighter and smaller accompanied by the increase in the degree of integration of large scale integrated circuits (LSI). Conventionally, mechanical parts of such apparatuses have been manufactured from metals, but there has been a remarkable tendency to attain weight saving thereof by making use of plastics as materials for, in particular, gears, bearings and chassises.

In such fields, there has been a need for plastics having excellent wear resistance, heat resistance and resistance to creep and conventionally, there has exclusively been used engineering plastics such as polyacetals and polyester resins.

Moreover, there has been a heed to save cost in addition to weight saving and miniaturization of such mechanical parts and the engineering plastics have gradually been replaced by less expensive plastics.

On the other hand, it is well known in such industrial fields that a resin composition having self-lubricating properties can be obtained by incorporating silicone oil into a styrene resin and it is already put into practical use in a certain number of applications, but such resin composition is still insufficient.

For instance, silicone oil-containing rubber-modified styrene type resins as disclosed in Japanese Patent Unexamined Publication (hereinafter referred to as "J.P. KOKAI") No. Sho 60-217254 are excellent in sliding properties, but cause various troubles during molding. More specifically, the amount of silicone oil to be incorporated into the styrene resin should be not less than 2 parts by weight to impart sliding properties required of such applications to the styrene type resins. The compatibility between silicone oil and the rubber-modified styrene resins is substantially low and silicone oil is liable to separate from the rubber-modified resins during molding as the added amount thereof increases. This leads to the production of molded products having poor appearance such as silver streaks and burn spots.

To solve this problem, it has been tried to elongate a molding cycle or to reduce the molding temperature. However, these methods cannot substantially solve the problem and thus it has been desired to solve the problem as soon as possible.

Furthermore, J.P. KOKAI No. Sho 59-108016 discloses a method for improving the dispersibility of silicone oil in a styrene polymer by adding silicone oil at a specified time in the course of polymerization when a styrene monomer is polymerized in the presence of a rubber substance, but this method cannot make it possible to solve the foregoing problem.

In addition, as disclosed in J.P. KOKAI Nos. Sho 62-39610 and Sho 63-182361, it is also conceivable that the aforementioned problem can be solved if the content of silicone oil in the styrene resins is relatively reduced by simultaneously using silicone oil and other sliding property-improving agents. However, the molded products resulting from such resin compositions are easily peeled off in thin layers at portions adjacent the mold gate and thus the problem has not yet completely been solved.

SUMMARY OF THE INVENTION

The inventors of this invention have conducted various studies directed of finding a solution of this problem. As a result, the inventors have found that it could effectively be solved by providing a resin composition composed of a rubber-modified styrene resin having a specific resin structure into which dimethyl silicone oil having a viscosity falling within a specific range is incorporated and thus have completed the present invention.

Consequently, the present invention relates to a rubber-modified styrene resin composition which comprises 100 parts by weight of a rubber-modified styrene type resin and 2.2 to 3.2 parts by weight of dimethyl silicone oil having a viscosity ranging from 5,000 to 15,000 centistokes at 25° C., the styrene resin comprising 3 to 8% by weight (on the basis of the total weight of the styrene resin) of a rubber-like polymer which is present in the form of microgels having an average particle size ranging from 0.6 to 1.2 micron, and having an intrinsic viscosity of 0.53 to 0.65 and the content of methanol-soluble matter ranging from 0.5 to 1.5% by weight based on the total weight of the resin.

DETAILED DESCRIPTION OF THE INVENTION

The rubber-modified styrene resin according to the present invention is composed of a rubber polymer and a polymer of a styrene monomer. Examples of such styrene monomers include styrene; styrenes whose side chain is replaced with an alkyl group such as alpha-methylstyrene and alpha-ethylstyrene; styrenes whose ring moiety is substituted with an alkyl group such as vinyl toluene and p-methylstyrene; and halogenated styrenes such as monochlorostyrene, dichlorostyrene, tribromostyrene and tetrabromostyrene. Particularly preferred are styrene and alpha-methylstyrene. These styrene monomers may be used alone or in combination. In addition, it is also possible to optionally use these styrene monomers in combination with other monomers such acrylonitrile monomers as acrylonitrile, methacrylonitrile and fumalonitrile; such maleimide monomers as maleimide, N-methylmaleimide and N-phenylmaleimide; such maleic acid monomers as maleic acid and maleic anhydride; and such acrylic ester monomers as methyl acrylate and methyl methacrylate.

Examples of the rubber polymers are polybutadiene, styrene-butadiene copolymer, butadiene-acrylonitrile copolymer, ethylene-propylene-diene copolymers and butadiene-acrylate copolymers.

The content of the rubber polymer in the rubber-modified styrene resin ranges from 3 to 8% by weight. This requirement is practically critical in the invention, because if the content is less than 3% by weight, the desired impact resistance of molded products is not achieved, while if it exceeds 8% by weight, the rigidity of the resulting molded products becomes insufficient. Therefore, the amount of the rubber polymer is selected so as to fall within the fore-going range depending on its applications.

The rubber polymer is dispersed in the rubber-modified resin in the form of particles to form a dispersed phase (hereinafter referred to as "microgel"). On the other hand, the polymers of the styrene monomers or copolymers thereof with optional other monomers form a continuous phase. The aforesaid microgel also comprises the styrene polymer in the grafted state or occluded state.

When examining an electron micrograph of the microgels, they are present like islands and the continuous phase is present like the sea. The average diameter X (micron) of the microgel is determined by taking an electron micrograph of the rubber-modified styrene resin according to ultrathin sectioning technique, determining diameters of 500 to 700 of rubber particles in the micrograph and then averaging these diameters using the following formula:

Average particle size X (micron) = $\Sigma nD^4/\Sigma nD^3$ wherein n is the number of microgels having a specific particle size of D micron.

The smaller the average diameter of the rubber polymer microgels in the rubber-modified styrene resin, the lower the coefficient of dynamic friction of the resin composition into which silicone oil is incorporated. However, if the average particle size is less than 0.6 micron, a sufficient impact resistance cannot be obtained even if the content of the rubber polymer falls within the foregoing range and, therefore, the molded products cannot practically be used. On the other hand, if it exceeds 1.2 micron, the coefficient of dynamic friction of the resulting resin composition increases and hence a sufficient sliding property (i.e., lowering of the coefficient of dynamic friction) is not obtained, although the composition provides molded products having sufficient strength. Taking into consideration the strength and sliding properties of the molded products, the average particle size of the microgels most preferably ranges from 0.6 to 1.0 micron.

The intrinsic viscosity of the rubber-modified styrene resin suitably ranges from 0.53 to 0.65 and preferably 0.55 to 0 60.

In this respect, the intrinsic viscosity is determined according to the following manner.

The rubber-modified styrene resin is dissolved in methyl ethyl ketone, followed by contrifuging the solution, again precipitating the resin with methanol and filtering the precipitates to recover the same. After drying the reprecipitated resin, 0.25 g of the resin is weighed out, dissolved in 50 ml of toluene and then filtered. The viscosity of toluene is determined with a Cannon-Fenske viscometer maintained at 30° C. (determining the flowing down time $t_1$) and thereafter the viscosity of the foregoing filtered solution (Sample solution) is determined (determining the flowing down time $t_2$). Then the intrinsic viscosity ([η]) can be calculated according to the following relations:

$\eta_r = t_2/t_1$; $\eta_{SP} = \eta_r - 1$ $[\eta] = [\eta_{SP} + 3\ln(\eta_r)]/4C$ wherein C is the concentration (g/100 ml) of Sample solution.

If the intrinsic viscosity determined according to the foregoing method is less than 0.53, the rigidity and impact resistance of the resultant molded products become insufficient and thus it is difficult to put them into practical use, while if the intrinsic viscosity exceeds 0.65, the compatibility between the rubber-modified styrene resin and silicone oil is impaired. As a result, silicone oil is separated from the resin composition during molding and there is obtained molded products having poor appearance such as silver streaks and burn spots. From the viewpoint of the balance between the compatibility with silicone oil and the strength of the molded product, the intrinsic viscosity is most preferably in the range of from 0.55 to 0.60.

The content of the methanol-soluble matter present in the rubber-modified styrene resin suitably ranges from 0.5 to 1.5% by weight and preferably 0.7 to 1.2% by weight based on the total weight of the modified styrene resin.

The content of the methanol-soluble substances can be determined according to the following method.

A known amount (A) of the rubber-modified styrene resin is dissolved in methyl ethyl ketone followed by centrifuging the solution, again precipitating the resin with methanol and then filtering. The filtrate is concentrated utilizing an evaporator, the residue is dried by an infrared lamp and then further dried in a vacuum dryer at 70° C. and 5 Torr for 3 hours. The resulting concentrated substance is weighed (B) and the content of the methanol-soluble matter is defined as (B/A)×100%.

If the content of the methanol-soluble matter is less than 0.5% by weight, the dispersion condition of silicone oil in the styrene resin matrix is impaired and the sliding effect of silicone oil is lowered. On the other hand, if it exceeds 1.5% by weight, the heat resistance of the resultant molded products is lowered and hence it becomes difficult to practically use products as mechanical parts.

The content of dimethylsilicone oil in the resin composition is suitably in the range of from 2.2 to 3.2 parts by weight and most preferably 2.5 to 3.0 parts by weight per 100 parts by weight of the rubber-modified styrene resin.

This is because if the content of dimethylsilicone oil is less than 2.2 parts by weight, sufficient sliding properties cannot be obtained, while it exceeds 3.2 parts by weight, the dispersion condition of dimethylsilicone oil included in the rubber-modified styrene resin becomes unstable, dimethylsilicone oil oozes out of the resin within a mold during molding to thus adhere to the surface of the mold and it is thus necessary to wipe the oil fully off the mold at proper time intervals.

Dimethylsilicone oil used in the composition of the present invention is represented by the following general formula:

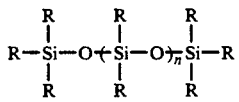

(wherein R represents a methyl group) and its viscosity is defined by the degree of polymerization n.

A variety of products having a viscosity ranging from 0.65 to several hundreds thousands centistokes are commercially available. Then, dimethylsilicone oil having a desired viscosity can be obtained by admixing dimethylsilicone oil of low viscosity and that of high viscosity.

More specifically, an intended dimethylsilicone oil having a desired viscosity ($\eta$) which can be determined by the following relation by mixing x g of a silicone oil of viscosity $\eta_1$ and y g of a silicone oil of viscosity $\eta_2$:

$$x\log\eta_1 + y\log\eta_2 = (x+y)\log\eta$$

The viscosity of dimethylsilicone oil measured at 25° C. which is incorporated into the rubber-modified styrene resin is suitably 5,000 to 15,000 centistokes.

If the viscosity of the dimethylsilicone oil is outside the foregoing range, the dispersion condition of dimethylsilicone oil in the rubber-modified styrene resin becomes unstable, a non-uniform dispersion of dimethylsilicone oil in the resin is observed and the content of dimethylsilicone oil becomes locally high. Therefore, it is liable to provide molded products having poor appearance such as silver streaks and bum spots during molding. The viscosity of dimethylsilicone oil is most preferably 10,000 to 13,000 centistokes from the aforesaid viewpoints.

The most remarkable reduction in the coefficient of dynamic friction of the resin composition is observed when dimethylsilicone oil is used. Other modified silicone oils such as phenyl methyl silicone oil, chlorophenyl silicone oil, amino-modified silicone oils, carboxylic acid-modified silicone oils and alcohol-modified silicone oils show low coefficient of dynamic friction-reducing effect and are also expensive. Therefore, the use thereof is not practically acceptable.

As methods for preparing the rubber-modified styrene resin composition of the present invention, there may be mentioned, for instance, a method in which the foregoing specific rubber-modified styrene resin and dimethylsilicone oil are admixed and dissolved in a mixer such as a single screw extruder or a twin-screw extruder, or a method in which the styrene monomer and dimethylsilicone oil are admixed in the course of the polymerization of the rubber-modified styrene resin.

EXAMPLES

The present invention will hereinafter be explained in more detail with reference to the following Examples and Comparative Examples.

Tests for the following physical properties of the resin composition are performed as follows:

(1) Determination of Coefficient of Dynamic Friction

Utilizing a thrust abration tester, the coefficient of friction with polystyrene resin (TOPOREX 860-01) was determined under the following conditions: sliding velocity of 1.2 m/min; load of 1.2 kg.

(2) Adhesion of Dimethylsilicone Oil to the Surface of Mold

Using a box-like mold of a size 120 mm × 150 mm × 12 mm and 1 mm thickness, the amount of dimethylsilicone oil adhered to the surface of the mold was determined by repeating shot molding 1,000 times at a molding temperature of 220° C., wiping the adhered dimethylsilicone oil off the surface of the mold and measuring the weight of the oil wiped off by a fluorescent X-ray method. The amount was expressed in the ratio (ppm) with respect to the amount of the resin required for molding.

(3) Silver streaking and burn spots of Molded Products

This was determined by repeating shot molding 1,000 times at a molding temperature of 220° C. utilizing the aforesaid mold and visually observing the appearance of the molded products. The silver streaks and burn spots are expressed in the number of molded products having silver streaks and burn spots.

(4) Flexural Strength

This was determined according to JIS-K6871.

(5) Izod Impact Strength

This was determined according to JIS-K6871.

(6) Vicat Softening Point

This was measured according to ASTM-D1525.

EXAMPLE 1

To an impact resistant polystyrene which has an intrinsic viscosity of 0.58, contains 1.06% by weight of methanol-soluble matter and 5.2% by weight of a rubber-like polymer whose microgels have an average particle size of 0.71 micron, there was added dimethylsilicone oil (available from Toray Silicone Co., Ltd. under the trade name of "SH-200 12500 cst") having a viscosity of 12,500 centistokes at 25° C. so that the content of the latter was 2.7% by weight, the resulting blend was mixed with one another and dissolved in a twin-screw extruder "AS-30" (manufactured and sold by NAKATANI Co., Ltd.) and then the mixture was pelletized to obtain samples.

According to the foregoing methods, the coefficient of dynamic friction, the amount of silicone oil adhered to the surface of the mold, the presence or absence of silver streaks and burn spots of the resultant molded product, flexural strength, Izod impact strength and Vicat softening point of the samples were determined and the results obtained were listed in Table 1 given below.

EXAMPLES 2 TO 11 AND COMPARATIVE EXAMPLES 1 TO 12

Resin compositions were prepared and their physical properties were evaluated according to the same manner as in Example 1 except that resin structures of impact resistant polystyrene used and the content and the viscosity of dimethyl-silicone oil used were changed to those listed in Table 1.

In this respect, the following dimethylsilicone oils having the specified viscosities were used in these Examples:

3,000 cst: Toray Silicone SH-200, 3,000 cst;
5,000 cst: Toray Silicone SH-200, 5,000 cst;
10,000 cst: Toray Silicone SH-200, 10,000 cst;
12,500 cst: Toray Silicone SH-200, 12,500 cst;
15,000 cst: 20:80 (weight ratio) mixture of Toray Silicone SH-200, 30,000 cst and Toray Silicone SH-200, 12,500 cst;
20,000 cst: 55:45 (weight ratio) mixture of Toray Silicone SH-200, 30,000 cst and Toray Silicone SH-200, 12,500 cst.

The results obtained in the physical properties evaluation test are summarized in Table 1.

COMPARATIVE EXAMPLES 13 TO 15

Resin compositions were prepared and their physical properties were evaluated in accordance with the same manner as in Example 1 except that in Comparative Example 13 Toray Silicone SH-710 was used; in Comparative Example 14 Toray Silicone BX 16-860 was used; and in Comparative Example 15 Toray Silicone SF8418 was used, and the results observed were summarized in the following Table 1.

COMPARATIVE EXAMPLE 16

In this Comparative Example, the resin composition comprised of the impact resistant polystyrene having the same resin structure as that used in Example 1, but not containing silicone oil was used.

As seen from the results listed in Table 1, the resin composition according to the present invention is excellent in sliding properties and thus the present invention makes it possible to solve the problem of poor appearance during molding by using the conventional resin compositions.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Resin Structure | Intrinsic Viscosity | 0.58 | 0.58 | 0.58 | 0.53 | 0.64 | 0.56 | 0.60 | 0.65 | 0.58 | 0.58 | 0.58 |
| | Methanol-Soluble Matter (wt %) | 1.06 | 1.06 | 1.06 | 0.90 | 1.22 | 0.55 | 0.73 | 1.41 | 1.06 | 1.06 | 1.06 |
| | Amount of Rubber Polymer (wt %) | 5.2 | 5.2 | 5.2 | 6.5 | 5.7 | 5.0 | 3.0 | 8.0 | 5.2 | 5.2 | 5.2 |
| | Average Particle Size of Rubber Polymer Microgel (μm) | 0.71 | 0.71 | 0.71 | 0.85 | 0.72 | 0.71 | 1.20 | 0.68 | 0.62 | 0.71 | 0.71 |
| Silicone Oil | Content (wt %) | 2.7 | 2.2 | 3.2 | 2.5 | 2.8 | 2.7 | 3.0 | 2.7 | 2.7 | 2.7 | 2.7 |
| | Viscosity (cst) | 12,500 | 12,500 | 12,500 | 12,500 | 12,500 | 10,000 | 12,500 | 10,000 | 10,000 | 5,000 | 15,000 |
| | Kind | DMS* | DMS | DMS | DMS | DMS | DMS | DMS | DMS | DMS | DMS | DMS |
| Coefficient of Dynamic Friction (—) | | 0.23 | 0.29 | 0.23 | 0.25 | 0.23 | 0.28 | 0.22 | 0.23 | 0.22 | 0.24 | 0.22 |
| Amount of Silicone Oil Adhered to the Surface of Mold (ppm) | | 0.03 | 0.03 | 0.09 | 0.02 | 0.08 | 0.02 | 0.09 | 0.04 | 0.03 | 0.07 | 0.02 |
| Silver Streaks and Burn Spots of Molded Product (shot number) | | 0 | 0 | 0 | 0 | 0 | 0 | 0 | 0 | 0 | 0 | 0 |
| Flexural Strength (Kgf/cm$^2$) | | 470 | 470 | 470 | 400 | 510 | 450 | 600 | 380 | 470 | 470 | 470 |
| Izod Impact Strength (Kgf cm/cm$^2$) | | 6 | 6 | 6 | 6 | 7 | 6 | 5 | 8 | 5 | 6 | 6 |
| Vicat Softening Point (°C.) | | 105 | 105 | 105 | 105 | 103 | 106 | 106 | 102 | 105 | 105 | 105 |

*Dimethylsilicone Oil

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Resin Structure | Intrinsic Viscosity | 0.58 | 0.58 | 0.50 | 0.69 | 0.60 | 0.60 | 0.60 | 0.65 | 0.58 | 0.58 | 0.58 |
| | Methanol-Soluble Matter (wt %) | 1.06 | 1.06 | 0.88 | 1.13 | 0.43 | 1.70 | 0.85 | 1.20 | 1.06 | 1.10 | 1.06 |
| | Amount of Rubber Polymer (wt %) | 5.2 | 5.2 | 6.5 | 5.8 | 4.8 | 6.7 | 2.5 | 9.0 | 5.2 | 5.3 | 5.2 |
| | Average Particle Size of Rubber Polymer Microgel (μm) | 0.71 | 0.71 | 0.83 | 0.71 | 0.70 | 0.72 | 0.68 | 1.20 | 0.55 | 1.62 | 0.71 |
| Silicone Oil | Content (wt %) | 2.0 | 3.5 | 2.5 | 2.8 | 2.7 | 2.7 | 3.0 | 2.6 | 2.7 | 2.7 | 2.7 |
| | Viscosity (cst) | 12,500 | 12,500 | 12,500 | 12,500 | 12,500 | 12,500 | 12,500 | 10,000 | 10,000 | 10,000 | 3,000 |
| | Kind | DMS | DMS | DMS | DMS | DMS | DMS | DMS | DMS | DMS | DMS | DMS |
| Coefficient of Dynamic Friction (—) | | 0.35 | 0.22 | 0.27 | 0.23 | 0.32 | 0.21 | 0.22 | 0.25 | 0.22 | 0.34 | 0.27 |
| Amount of Silicone Oil Adhered to the Surface of Mold (ppm) | | 0.03 | 0.41 | 0.03 | 0.29 | 0.08 | 0.02 | 0.07 | 0.03 | 0.03 | 0.02 | 0.12 |
| Silver Streaks and Burn Spots of Molded Product (shot number) | | 0 | 2 | 0 | 51 | 1 | 0 | 0 | 0 | 0 | 0 | 30 |
| Flexural Strength (Kgf/cm$^2$) | | 470 | 470 | 350 | 550 | 480 | 480 | 600 | 330 | 480 | 450 | 470 |
| Izod Impact Strength (Kgf cm/cm$^2$) | | 6 | 6 | 4 | 7 | 6 | 7 | 3 | 9 | 3 | 6 | 6 |
| Vicat Softening Point (°C.) | | 105 | 105 | 104 | 104 | 106 | 97 | 106 | 102 | 105 | 104 | 105 |

| | | Comparative Example | | | | |
|---|---|---|---|---|---|---|
| | | 12 | 13 | 14 | 15 | 16 |
| Resin Structure | Intrinsic Viscosity | 0.58 | 0.58 | 0.58 | 0.58 | 0.58 |
| | Methanol-Soluble Matter (wt %) | 1.06 | 1.06 | 1.06 | 1.06 | 1.06 |
| | Amount of Rubber Polymer (wt %) | 5.2 | 5.2 | 5.2 | 5.2 | 5.2 |
| | Average Particle Size of Rubber Polymer Microgel (μm) | 0.71 | 0.71 | 0.71 | 0.71 | 0.71 |
| Silicone Oil | Content (wt %) | 2.7 | 2.7 | 2.7 | 2.7 | — |
| | Viscosity (cst) | 20,000 | 500 | 11,000 | 2,500 | — |
| | Kind | DMS | PMS** | Amino-modified Silicone Oil | Carboxylic Acid-modified Silicone Oil | — |
| Coefficient of Dynamic Friction (—) | | 0.26 | 0.36 | 0.38 | 0.38 | 0.45 |
| Amount of Silicone Oil Adhered to the Surface of Mold (ppm) | | 0.15 | 0.02 | 0.02 | 0.02 | 0 |
| Silver Streaks and Burn Spots of Molded Product (shot number) | | 18 | 0 | 0 | 0 | 0 |
| Flexural Strength (Kgf/cm$^2$) | | 470 | 470 | 470 | 470 | 470 |
| Izod Impact Strength (Kgf cm/cm$^2$) | | 6 | 6 | 6 | 6 | 6 |
| Vicat Softening Point (°C.) | | 105 | 105 | 105 | 105 | 105 |

**Phenylmethylsilicone oil

What is claimed is:

1. A rubber-modified styrene resin composition which comprises 100 parts by weight of a rubber-modified styrene resin and 2.2 to 3.2 parts by weight of dimethyl silicone oil having a viscosity ranging from 5,000 to 15,000 centistokes at 25° C., the styrene resin comprising 3 to 8% by weight, based on the total weight of the resin, of a rubber polymer which is present in the form of microgels having an average particle size ranging from 0.6 to 1.2 micron, and having an intrinsic viscosity of 0.53 to 0.65 and the content of methanol-soluble matter ranging from 0.5 to 1.5% by weight based on the total weight of the resin.

2. A composition as set forth in claim 1 wherein the rubber polymer is present in the composition in the form of microgels having an average particle size ranging from 0.6 to 1.0 micron.

3. A composition as set forth in claim 1 wherein the intrinsic viscosity of the rubber-modified styrene resin ranges from 0.55 to 0.60 centistokes.

4. A composition as set forth in claim 1 wherein the content of the methanol-soluble substances of the rubber-modified styrene resin ranges from 0.7 to 1.2% by weight on the basis of the total weight of the resin.

5. A composition as set forth in claim 1 wherein the content of dimethylsilicone oil ranges from 2.5 to 3.0 parts by weight per 100 parts by weight of the rubber-modified styrene resin.

6. A composition as set forth in claim 1 wherein the viscosity of dimethylsilicone oil at 25° C. ranges from 10,000 to 13,000 centistokes.

* * * * *